(12) United States Patent  (10) Patent No.: US 10,338,748 B1
Yilmaz et al.                (45) Date of Patent: *Jul. 2, 2019

(54) REDUCTION OF TOUCH SENSOR PATTERN VISIBILITY USING BEAMSPLITTERS (71) Applicant: Neodrón Limited, Dublin (IE)

(72) Inventors: Esat Yilmaz, Santa Cruz, CA (US); Neerja Saran, Fremont, CA (US)

(73) Assignee: Neodrón Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 16/282,531

(22) Filed: Feb. 22, 2019

Related U.S. Application Data

(63) Continuation of application No. 13/828,021, filed on Mar. 14, 2013, now Pat. No. 10,241,623.

(51) Int. Cl.
G06F 3/044 (2006.01)
G06F 3/042 (2006.01)

(52) U.S. Cl.
CPC .............. *G06F 3/042* (2013.01); *G06F 3/044* (2013.01); *G06F 3/0421* (2013.01); *Y10S 977/742* (2013.01)

(58) Field of Classification Search
CPC ...................................................... G06F 3/041
USPC ................................................. 345/173–179
See application file for complete search history.

(56) References Cited

U.S. PATENT DOCUMENTS

| 4,873,398 | A | * | 10/1989 | Hubby, Jr. | ............ | G06F 3/0418 |
| | | | | | | 178/18.07 |
| 7,290,129 | B2 | | 10/2007 | Chebolu et al. | | |
| 7,663,607 | B2 | | 2/2010 | Hotelling | | |
| 7,875,814 | B2 | | 1/2011 | Chen | | |
| 8,031,094 | B2 | | 10/2011 | Hotelling | | |
| 8,031,174 | B2 | | 10/2011 | Hamblin | | |
| 8,040,326 | B2 | | 10/2011 | Hotelling | | |
| 8,049,732 | B2 | | 11/2011 | Hotelling | | |
| 8,179,381 | B2 | | 5/2012 | Frey | | |
| 2003/0116270 | A1 | * | 6/2003 | Hawa | ...................... | G02B 1/111 |
| | | | | | | 156/307.1 |
| 2006/0132462 | A1 | * | 6/2006 | Geaghan | ................. | G06F 3/044 |
| | | | | | | 345/173 |
| 2007/0159561 | A1 | * | 7/2007 | Chien | ................. | G02F 1/13338 |
| | | | | | | 349/12 |
| 2009/0135151 | A1 | * | 5/2009 | Sun | ......................... | G06F 3/041 |
| | | | | | | 345/173 |
| 2009/0315854 | A1 | | 12/2009 | Matsuo | | |

(Continued)

FOREIGN PATENT DOCUMENTS

WO   2012/129247   9/2012

OTHER PUBLICATIONS

U.S. Appl. No. 61/454,936, filed Mar. 21, 2011, Myers.
U.S. Appl. No. 61/454,950, filed Mar. 21, 2011, Lynch.
U.S. Appl. No. 61/454,894, filed Mar. 21, 2011, Rothkopf.

*Primary Examiner* — Vijay Shankar
*Assistant Examiner* — Cory A Almeida
(74) *Attorney, Agent, or Firm* — Shami Messinger PLLC (57) ABSTRACT

In one embodiment, a touch sensor comprises a beamsplitter operable to reflect a first portion of light incident on the beamsplitter and transmit a second portion of light incident on the beamsplitter, a substrate, and one or more lines of conductive material disposed on the substrate, the lines of conductive material disposed between the first substrate and the beamsplitter.

19 Claims, 3 Drawing Sheets

(56) References Cited

U.S. PATENT DOCUMENTS

| | | | |
|---|---|---|---|
| 2010/0045620 A1* | 2/2010 | Long | G06F 3/0412 345/173 |
| 2010/0123670 A1* | 5/2010 | Philipp | G06F 3/044 345/173 |
| 2012/0044187 A1* | 2/2012 | Polishchuk | G06F 3/044 345/174 |
| 2012/0242588 A1 | 9/2012 | Myers | |
| 2012/0242592 A1 | 9/2012 | Rothkopf | |
| 2012/0243151 A1 | 9/2012 | Lynch | |
| 2012/0243719 A1 | 12/2012 | Franklin | |
| 2013/0076612 A1 | 3/2013 | Myers | |

* cited by examiner

REDUCTION OF TOUCH SENSOR PATTERN VISIBILITY USING BEAMSPLITTERS

CROSS-REFERENCES TO RELATED APPLICATIONS

This application is continuation of application Ser. No. 13/828,021, filed Mar. 14, 2013, now allowed, incorporated by reference in its entirety herein.

TECHNICAL FIELD

This disclosure generally relates to touch sensors, and more particularly to the reduction of touch sensor pattern visibility using beamsplitters.

BACKGROUND

In touch screen configurations with certain touch sensors overlaid on a display, such as metal or metal-based touch sensors, the touch sensors may reflect light that is incident upon the touch sensors and may cause an undesirable view of the display. For instance, the user of a touch screen device may be able to see the liens of touch sensors overlaid on the display. This issue is especially prevalent when the display is dark or turned off, or in certain ambient light conditions.

Some current systems may attempt to prevent touch sensor visibility issues by depositing a dark coating on top of the touch sensors to make them less reflective. However, this may require additional material and/or equipment costs. In addition, this process may require careful control over the coating thickness to avoid losing conductivity, and thus performance, of the sensors. Furthermore, the dark coating may still be viewable, reducing the overall visual quality of the sensor and display, and certain issues of non-uniformity of the dark coating may also produce striping or banding patterns of the touch sensors over the display.

Other current systems for reducing the visibility of touch sensor patterns may include circular polarizer elements. However, circular polarizers may largely reduce the amount of light transmitted from the underlying display, for example by 50% to 60%. In addition, circular polarizers may only be used in conjunction with non-birefringent substrates (e.g., glass, cyclo-olefin polymer (COP), or cyclic olefin copolymers (COC)). Otherwise, they may cause rainbow effects in the image seen by a user of the device due to birefringence. Furthermore, circular polarizers may be relatively thick, and may be approximately 200-300 μm.

Other current systems for reducing the visibility of touch sensor patterns may include multi-layer stacks of anti-reflection coatings and index-matched coatings. These multi-layer coatings may be quite expensive, however, and may be quite thick.

DESCRIPTION OF EXAMPLE EMBODIMENTS

In touch screen configurations with certain touch sensors overlaid on a display, such as metal or metal-based touch sensors, the touch sensors may reflect light that is incident upon the touch sensors and may cause an undesirable view of the display. For instance, the user of a touch screen device may be able to see the lines of touch sensors overlaid on the display. This issue is especially prevalent when the display is dark or turned off, or in certain ambient light conditions.

Some current systems may attempt to prevent touch sensor visibility issues by depositing a dark coating on top of the touch sensors to make them less reflective. However, this may require additional material and/or equipment costs. In addition, this process may require careful control over the coating thickness to avoid losing conductivity, and thus performance, of the sensors. Furthermore, the dark coating may still be viewable, reducing the overall visual quality of the sensor and display, and certain issues of non-uniformity of the dark coating may also produce striping or banding patterns of the touch sensors over the display.

Other current systems for reducing the visibility of touch sensor patterns may include circular polarizer elements. However, circular polarizers may largely reduce the amount of light transmitted from the underlying display, for example by 50% to 60%. In addition, circular polarizers may only be used in conjunction with non-birefringent substrates (e.g., glass, cyclo-olefin polymer (COP), or cyclic olefin copolymers (COC)). Otherwise, they may cause rainbow effects in the image seen by a user of the device due to birefringence. Furthermore, circular polarizers may be relatively thick, and may be approximately 200-300 μm.

Other current systems for reducing the visibility of touch sensor patterns may include multi-layer stacks of anti-reflection coatings and index-matched coatings. These multi-layer coatings may be quite expensive, however, and may be quite thick.

Accordingly, particular embodiments of the present disclosure may attend to the above problem by placing a beamsplitter or half-mirror coating on top of lines of touch sensors in order to reduce the display issues caused by the reflective touch sensor. Typically, touch sensors are most visible when a display is relatively dark or is off (e.g., a "black" background). The beamsplitter or half-mirror coating may reduce the visibility of the touch sensors by reflecting a majority of incident light from the beamsplitter and transmitting only a small amount of incident light through the beamsplitter to the lines of touch sensors, preventing a large amount of light from being reflected by the sensors and thus preventing a viewer from seeing any reflected touch sensors. For example, in particular embodiments, a beamsplitter coupled to an underlying display may transmit light from the underlying display while it is on and maintain a substantially mirrored finish when the display is off. This effect is based on a differential between the ambient light and the light coming from the underlying display. If the intensity of the light coming from the display is greater than the intensity of the light shining on the surface (i.e., ambient light), a viewer will be able to see the image behind the beamsplitter. Otherwise, the screen will take on a shiny, mirrored look to the viewer.

Certain advantages of the present disclosure may include a reduction in the visibility of the touch sensors overlaying a display without compromising the touch sensor performance or the quality of display. Moreover, by using a beamsplitter according to the present disclosure, there is no further need to apply a dark coating on the touch sensors, which reduces manufacturing time and costs. The present disclosure also prevents the need for additional raw materials and/or equipment required to coat the touch sensors, and does not require any substantial new manufacturing investment as it employs a simple step of placing a relatively inexpensive half-mirror coating over the touch sensors. Furthermore, beamsplitters may be manufactured inexpensively on a substrate with self-adhesive polymer which may prevent fingerprints, dirt, dust, and/or scratches from marking the screen. In addition, the beamsplitter or coating may be relatively easy to apply or remove and will not disrupt the touchscreen functions of the device.

A beamsplitter (which may be sometimes known or referred to as a half-mirror) may refer to an optical element with a semi-transparent coating that divides a beam into two or more separate beams. For example, a beamsplitter may cause an incident light ray to be divided into two rays: one that is reflected by the beamsplitter and one that is transmitted by the beamsplitter. The multiple resulting light rays may each comprise a portion of the incident light upon the beamsplitter. For instance, in the above example, the reflected ray may comprise 70% of the incident ray's power while the transmitted ray may comprise 30% of the incident ray's power. Beamsplitter coatings, in some embodiments, may be constructed with dielectric layers on a surface to yield specific transmission and reflection characteristics. The dielectric nature of the coatings may not affect the normal functioning of touch sensor. Reflection proportions for beamsplitters may be in the range from 30% to 95%, with the remaining percentage of the light being transmitted through the coating without any absorption. In particular embodiments, beamsplitter coatings may be made using dielectric coatings with reflection ranges from 50% to 75% and transmittance ranges from 50% to 25%. These ranges of reflection and transmittance may allow for sufficient enough reduction of the visibility of the touch sensor lines while also will allowing sufficient contrast ratios for the displayed images. In certain embodiments, a second surface may then be coated with an anti-reflective coating to reduce "ghost" images.

Figure 1:
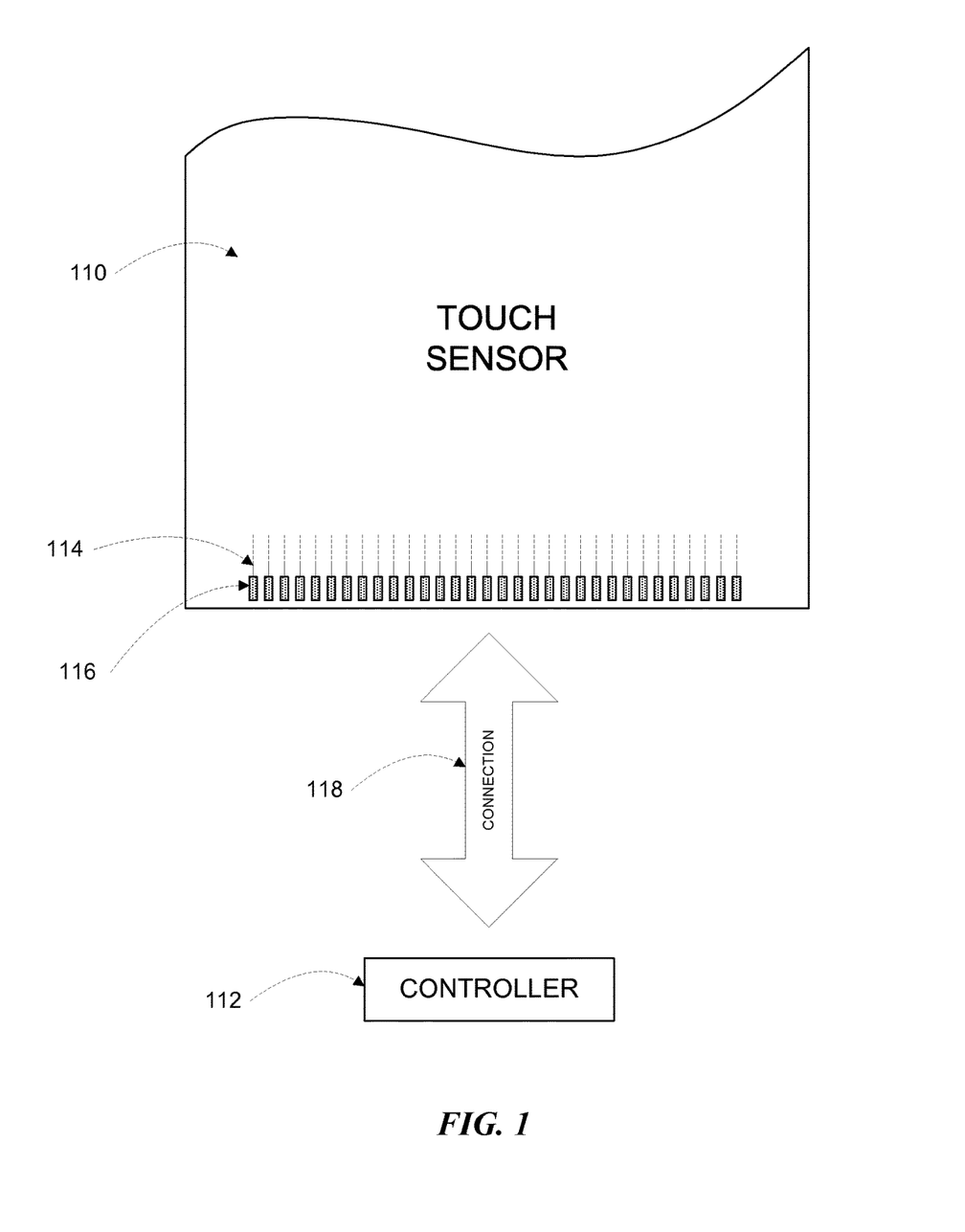
FIG. 1 illustrates an example touch sensor according to particular embodiments of the present disclosure.

FIG. 1 illustrates an example touch sensor 110 with an example touch-sensor controller 112. Touch sensor 110 and touch-sensor controller 112 may detect the presence and location of a touch or the proximity of an object within a touch-sensitive area of touch sensor 110. Herein, reference to a touch sensor may encompass both the touch sensor and its touch-sensor controller, where appropriate. Similarly, reference to a touch-sensor controller may encompass both the touch-sensor controller and its touch sensor, where appropriate. Touch sensor 110 may include one or more touch-sensitive areas, where appropriate. Touch sensor 110 may include an array of drive and sense electrodes (or an array of electrodes of a single type) disposed on one or more substrates, which may be made of a dielectric material. Herein, reference to a touch sensor may encompass both the electrodes of the touch sensor and the substrate(s) that they are disposed on, where appropriate. Alternatively, where appropriate, reference to a touch sensor may encompass the electrodes of the touch sensor, but not the substrate(s) that they are disposed on.

An electrode (whether a ground electrode, a guard electrode, a drive electrode, or a sense electrode) may be an area of conductive material forming a shape, such as for example a disc, square, rectangle, thin line, other suitable shape, or suitable combination of these. One or more cuts in one or more layers of conductive material may (at least in part) create the shape of an electrode, and the area of the shape may (at least in part) be bounded by those cuts. In particular embodiments, the conductive material of an electrode may occupy approximately 100% of the area of its shape. As an example and not by way of limitation, an electrode may be made of indium tin oxide (ITO) and the ITO of the electrode may occupy approximately 100% of the area of its shape (sometimes referred to as 100% fill), where appropriate. In particular embodiments, the conductive material of an electrode may occupy substantially less than 100% of the area of its shape. As an example and not by way of limitation, an electrode may be made of fine lines of metal or other conductive material (FLM), such as for example copper, silver, or a copper- or silver-based material, and the fine lines of conductive material may occupy approximately 5% of the area of its shape in a hatched, mesh, or other suitable pattern. Herein, reference to FLM encompasses such material, where appropriate. Although this disclosure describes or illustrates particular electrodes made of particular conductive material forming particular shapes with particular fill percentages having particular patterns, this disclosure contemplates any suitable electrodes made of any suitable conductive material forming any suitable shapes with any suitable fill percentages having any suitable patterns.

Where appropriate, the shapes of the electrodes (or other elements) of a touch sensor may constitute in whole or in part one or more macro-features of the touch sensor. One or more characteristics of the implementation of those shapes (such as, for example, the conductive materials, fills, or patterns within the shapes) may constitute in whole or in part one or more micro-features of the touch sensor. One or more macro-features of a touch sensor may determine one or more characteristics of its functionality, and one or more micro-features of the touch sensor may determine one or more optical features of the touch sensor, such as transmittance, refraction, or reflection.

A mechanical stack may contain the substrate (or multiple substrates) and the conductive material forming the drive or sense electrodes of touch sensor 110. As an example and not by way of limitation, the mechanical stack may include a first layer of optically clear adhesive (OCA) beneath a cover panel. The cover panel may be clear and made of a resilient material suitable for repeated touching, such as for example glass, polycarbonate, or poly(methyl methacrylate) (PMMA). This disclosure contemplates any suitable cover panel made of any suitable material. The first layer of OCA may be disposed between the cover panel and the substrate with the conductive material forming the drive or sense electrodes. The mechanical stack may also include a second layer of OCA and a dielectric layer (which may be made of PET or another suitable material, similar to the substrate with the conductive material forming the drive or sense electrodes). As an alternative, where appropriate, a thin coating of a dielectric material may be applied instead of the second layer of OCA and the dielectric layer. The second layer of OCA may be disposed between the substrate with the conductive material making up the drive or sense electrodes and the dielectric layer, and the dielectric layer may be disposed between the second layer of OCA and an air gap to a display of a device including touch sensor 110 and touch-sensor controller 112. As an example only and not by way of limitation, the cover panel may have a thickness of approximately 1 mm; the first layer of OCA may have a thickness of approximately 0.05 mm; the substrate with the conductive material forming the drive or sense electrodes may have a thickness of approximately 0.05 mm; the second layer of OCA may have a thickness of approximately 0.05 mm; and the dielectric layer may have a thickness of approximately 0.05 mm. Although this disclosure describes a particular mechanical stack with a particular number of particular layers made of particular materials and having particular thicknesses, this disclosure contemplates any suitable mechanical stack with any suitable number of any suitable layers made of any suitable materials and having any suitable thicknesses. As an example and not by way of limitation, in particular embodiments, a layer of adhesive or dielectric may replace the dielectric layer, second layer of OCA, and air gap described above, with there being no air gap to the display.

One or more portions of the substrate of touch sensor 110 may be made of polyethylene terephthalate (PET) or another suitable material. This disclosure contemplates any suitable substrate with any suitable portions made of any suitable material. In particular embodiments, the drive or sense electrodes in touch sensor 110 may be made of ITO in whole or in part. In particular embodiments, the drive or sense electrodes in touch sensor 110 may be made of fine lines of metal or other conductive material. As an example and not by way of limitation, one or more portions of the conductive material may be copper or copper-based and have a thickness of approximately 5 µm or less and a width of approximately 10 µm or less. As another example, one or more portions of the conductive material may be silver or silver-based and similarly have a thickness of approximately 5 µm or less and a width of approximately 10 µm or less. This disclosure contemplates any suitable electrodes made of any suitable material.

Touch sensor 110 may implement a capacitive form of touch sensing. In a mutual-capacitance implementation, touch sensor 110 may include an array of drive and sense electrodes forming an array of capacitive nodes. A drive electrode and a sense electrode may form a capacitive node. The drive and sense electrodes forming the capacitive node may come near each other, but not make electrical contact with each other. Instead, the drive and sense electrodes may be capacitively coupled to each other across a space between them. A pulsed or alternating voltage applied to the drive electrode (by touch-sensor controller 112) may induce a charge on the sense electrode, and the amount of charge induced may be susceptible to external influence (such as a touch or the proximity of an object). When an object touches or comes within proximity of the capacitive node, a change in capacitance may occur at the capacitive node and touch-sensor controller 112 may measure the change in capacitance. By measuring changes in capacitance throughout the array, touch-sensor controller 112 may determine the position of the touch or proximity within the touch-sensitive area(s) of touch sensor 110.

In a self-capacitance implementation, touch sensor 110 may include an array of electrodes of a single type that may each form a capacitive node. When an object touches or comes within proximity of the capacitive node, a change in self-capacitance may occur at the capacitive node and touch-sensor controller 112 may measure the change in capacitance, for example, as a change in the amount of charge needed to raise the voltage at the capacitive node by a pre-determined amount. As with a mutual-capacitance implementation, by measuring changes in capacitance throughout the array, touch-sensor controller 112 may determine the position of the touch or proximity within the touch-sensitive area(s) of touch sensor 110. This disclosure contemplates any suitable form of capacitive touch sensing, where appropriate.

In particular embodiments, one or more drive electrodes may together form a drive line running horizontally or vertically or in any suitable orientation. Similarly, one or more sense electrodes may together form a sense line running horizontally or vertically or in any suitable orientation. In particular embodiments, drive lines may run substantially perpendicular to sense lines. Herein, reference to a drive line may encompass one or more drive electrodes making up the drive line, and vice versa, where appropriate. Similarly, reference to a sense line may encompass one or more sense electrodes making up the sense line, and vice versa, where appropriate.

Touch sensor 110 may have drive and sense electrodes disposed in a pattern on one side of a single substrate. In such a configuration, a pair of drive and sense electrodes capacitively coupled to each other across a space between them may form a capacitive node. For a self-capacitance implementation, electrodes of only a single type may be disposed in a pattern on a single substrate. In addition or as an alternative to having drive and sense electrodes disposed in a pattern on one side of a single substrate, touch sensor 110 may have drive electrodes disposed in a pattern on one side of a substrate and sense electrodes disposed in a pattern on another side of the substrate. Moreover, touch sensor 110 may have drive electrodes disposed in a pattern on one side of one substrate and sense electrodes disposed in a pattern on one side of another substrate. In such configurations, an intersection of a drive electrode and a sense electrode may form a capacitive node. Such an intersection may be a location where the drive electrode and the sense electrode "cross" or come nearest each other in their respective planes. The drive and sense electrodes do not make electrical contact with each other—instead they are capacitively coupled to each other across a dielectric at the intersection. Although this disclosure describes particular configurations of particular electrodes forming particular nodes, this disclosure contemplates any suitable configuration of any suitable electrodes forming any suitable nodes. Moreover, this disclosure contemplates any suitable electrodes disposed on any suitable number of any suitable substrates in any suitable patterns.

As described above, a change in capacitance at a capacitive node of touch sensor 110 may indicate a touch or proximity input at the position of the capacitive node. Touch-sensor controller 112 may detect and process the change in capacitance to determine the presence and location of the touch or proximity input. Touch-sensor controller 112 may then communicate information about the touch or proximity input to one or more other components (such one or more central processing units (CPUs)) of a device that includes touch sensor 110 and touch-sensor controller 112, which may respond to the touch or proximity input by initiating a function of the device (or an application running on the device). Although this disclosure describes a particular touch-sensor controller having particular functionality with respect to a particular device and a particular touch sensor, this disclosure contemplates any suitable touch-sensor controller having any suitable functionality with respect to any suitable device and any suitable touch sensor.

Touch-sensor controller 112 may be one or more integrated circuits (ICs), such as for example general-purpose microprocessors, microcontrollers, programmable logic devices or arrays, application-specific ICs (ASICs). In particular embodiments, touch-sensor controller 112 comprises analog circuitry, digital logic, and digital non-volatile memory. In particular embodiments, touch-sensor controller 112 is disposed on a flexible printed circuit (FPC) bonded to the substrate of touch sensor 110, as described below. The FPC may be active or passive, where appropriate. In particular embodiments, multiple touch-sensor controllers 112 are disposed on the FPC. Touch-sensor controller 112 may include a processor unit, a drive unit, a sense unit, and a storage unit. The drive unit may supply drive signals to the drive electrodes of touch sensor 110. The sense unit may sense charge at the capacitive nodes of touch sensor 110 and provide measurement signals to the processor unit representing capacitances at the capacitive nodes. The processor unit may control the supply of drive signals to the drive electrodes by the drive unit and process measurement signals from the sense unit to detect and process the presence and location of a touch or proximity input within the touch-sensitive area(s) of touch sensor 110. The processor unit may also track changes in the position of a touch or proximity input within the touch-sensitive area(s) of touch sensor 110. The storage unit may store programming for execution by the processor unit, including programming for controlling the drive unit to supply drive signals to the drive electrodes, programming for processing measurement signals from the sense unit, and other suitable programming, where appropriate. Although this disclosure describes a particular touch-sensor controller having a particular implementation with particular components, this disclosure contemplates any suitable touch-sensor controller having any suitable implementation with any suitable components.

Tracks 114 of conductive material disposed on the substrate of touch sensor 110 may couple the drive or sense electrodes of touch sensor 110 to connection pads 116, also disposed on the substrate of touch sensor 110. As described below, connection pads 116 facilitate coupling of tracks 114 to touch-sensor controller 112. Tracks 114 may extend into or around (e.g. at the edges of) the touch-sensitive area(s) of touch sensor 110. Particular tracks 114 may provide drive connections for coupling touch-sensor controller 112 to drive electrodes of touch sensor 110, through which the drive unit of touch-sensor controller 112 may supply drive signals to the drive electrodes. Other tracks 114 may provide sense connections for coupling touch-sensor controller 112 to sense electrodes of touch sensor 110, through which the sense unit of touch-sensor controller 112 may sense charge at the capacitive nodes of touch sensor 110. Tracks 114 may be made of fine lines of metal or other conductive material. As an example and not by way of limitation, the conductive material of tracks 114 may be copper or copper-based and have a width of approximately 100 μm or less. As another example, the conductive material of tracks 114 may be silver or silver-based and have a width of approximately 100 μm or less. In particular embodiments, tracks 114 may be made of ITO in whole or in part in addition or as an alternative to fine lines of metal or other conductive material. Although this disclosure describes particular tracks made of particular materials with particular widths, this disclosure contemplates any suitable tracks made of any suitable materials with any suitable widths. In addition to tracks 114, touch sensor 110 may include one or more ground lines terminating at a ground connector (which may be a connection pad 116) at an edge of the substrate of touch sensor 110 (similar to tracks 114).

Connection pads 116 may be located along one or more edges of the substrate, outside the touch-sensitive area(s) of touch sensor 110. As described above, touch-sensor controller 112 may be on an FPC. Connection pads 116 may be made of the same material as tracks 114 and may be bonded to the FPC using an anisotropic conductive film (ACF). Connection 118 may include conductive lines on the FPC coupling touch-sensor controller 112 to connection pads 116, in turn coupling touch-sensor controller 112 to tracks 114 and to the drive or sense electrodes of touch sensor 110. In another embodiment, connection pads 116 may be connected to an electro-mechanical connector (such as a zero insertion force wire-to-board connector); in this embodiment, connection 118 may not need to include an FPC. This disclosure contemplates any suitable connection 118 between touch-sensor controller 112 and touch sensor 110.

Figure 2A:
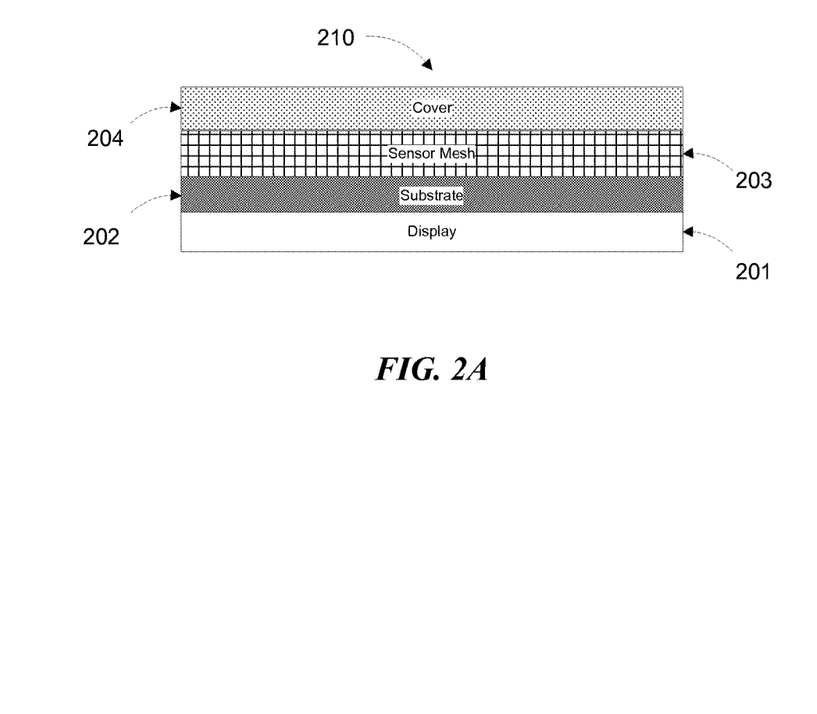
FIGS. 2A-2B illustrate an example touch screen device without a beamsplitter.
Figure 2B:
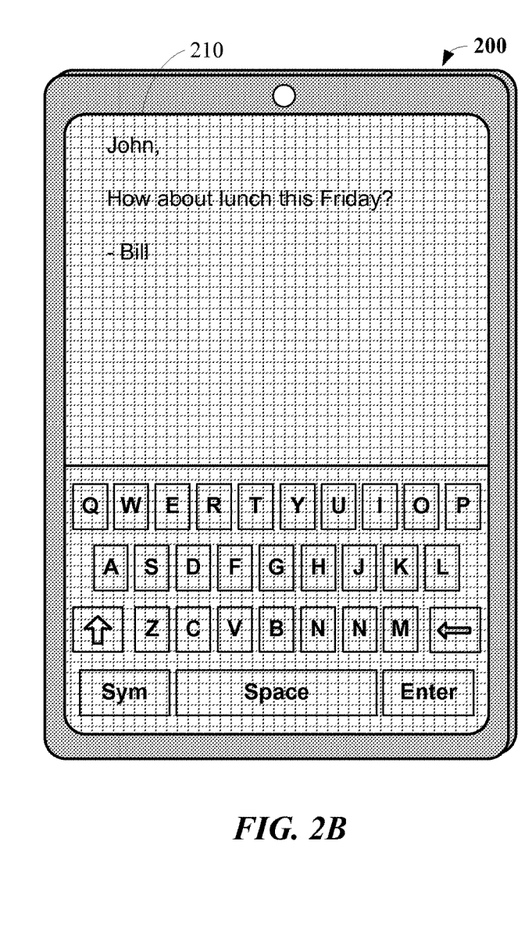

FIGS. 2A-2B illustrate an example touch screen device 200 without a beamsplitter. FIG. 2A illustrates a cross-sectional view of a display stack 210 that may be used in device 200 illustrated in FIG. 2B. Stack 210 comprises a display 201, a substrate 202, a touch sensor mesh 203, and cover 204. Display 201 may be any suitable display for use in a touch screen device such as device 200, and may include a liquid crystal display (LCD). Substrate 202 may be any material suitable for use in a touch screen device such as device 200, and may include a polymer material such as polyethylene terephthalate (PET). Sensor mesh 203 may include any suitable mesh of lines of conductive material for sensing touches on cover 204 by a user of device 200, and may include lines of a metal such as copper or other conductive materials such as ITO, carbon nanotubes, metallic nanowires, nanoribbons, or nanoparticles. In particular embodiments, sensor mesh 203 may be coupled to one or more substrate materials (not shown), such as polymer materials that include PET. For example, sensor mesh 203 may be coupled to a single side of a PET substrate. As another example, sensor mesh 203 may be disposed between two PET substrates. Cover 204 may be any suitable material for covering and protecting the materials of stack 210, and may include glass or a polymer material such as PET.

As shown in FIG. 2B, when sensor mesh 203 includes certain touch sensors, such as metal or metal-based touch sensors, the sensors may reflect light that is incident upon them and may cause an undesirable view of the display. For instance, the user of device 200 may be able to see the sensor mesh 203 when using device 200. This undesirable effect may be particularly evident in certain ambient lighting situations, such as intense ambient light (e.g., using the device outdoors) or when the display is turned off. Accordingly, in particular embodiments, a beamsplitter may be used in the display stack as shown in FIGS. 3A-3B and described further below in order to reduce the visibility of sensor mesh 203 when using device 200.

Figure 3A:
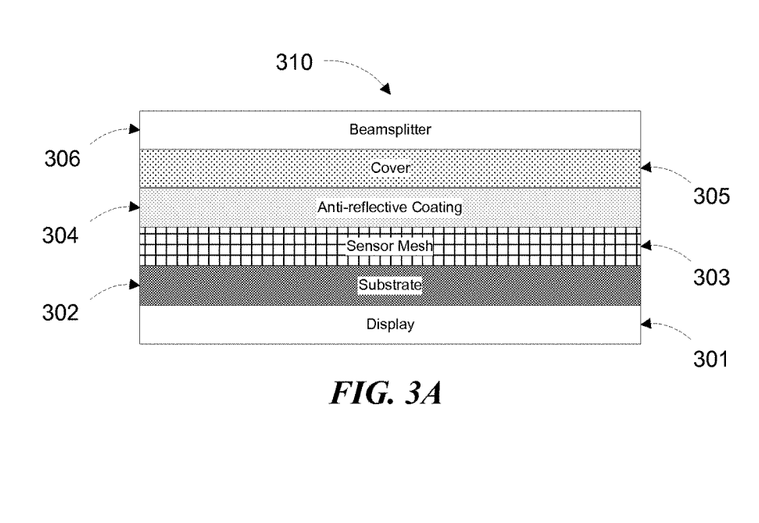
FIGS. 3A-3B illustrate an example touch screen device including a beamsplitter according to particular embodiments of the present disclosure.
Figure 3B:
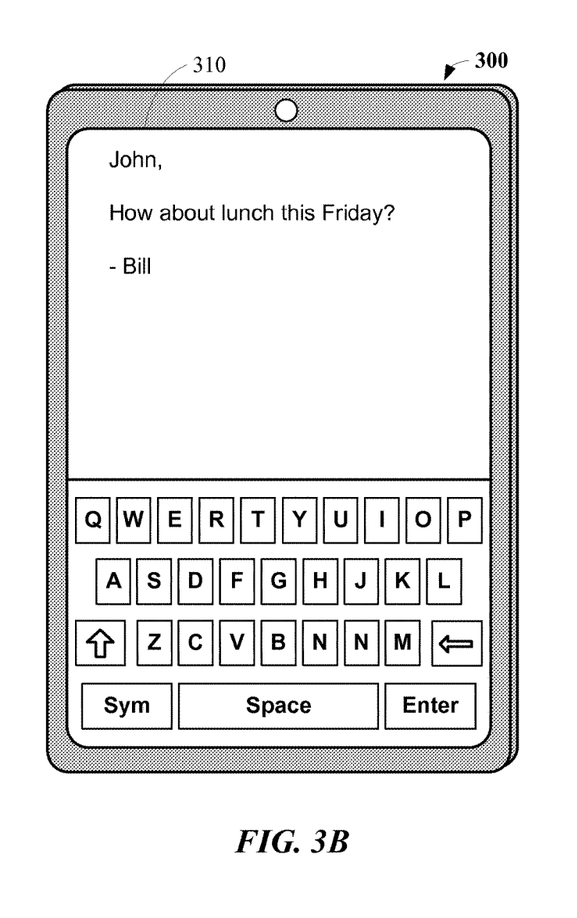

FIGS. 3A-3B illustrate an example touch screen device 300 including a beamsplitter 306 according to embodiments of the present disclosure. FIG. 3A illustrates a cross-sectional view of a display stack 310 that may be used in device 300 illustrated in FIG. 3B. Stack 310 comprises a display 301, a substrate 302, a touch sensor mesh 303, anti-reflective coating 304, cover 305, and beamsplitter 306. Display 201 may be any suitable display for use in a touch screen device such as device 200, and may include a liquid crystal display (LCD). Substrate 202 may be any material suitable for use in a touch screen device such as device 200, and may include a polymer material such as polyethylene terephthalate (PET). Sensor mesh 203 may include any suitable mesh of lines of conductive material for sensing touches on cover 204 by a user of device 200, and may include lines of a metal such as copper or other conductive materials such as ITO, carbon nanotubes, metallic nanowires, nanoribbons, or nanoparticles. In particular embodiments, sensor mesh 303 may be coupled to one or more substrate materials (not shown), such as polymer materials that include PET. For example, sensor mesh 303 may be coupled to a single side of a PET substrate. As another example, sensor mesh 303 may be disposed between two PET substrates. Cover 305 may be any suitable material for covering and protecting the materials of stack 310, and may include glass or a polymer material such as PET. In particular embodiments, cover 305 may act as a substrate for beamsplitter 306 and/or anti-reflective coating 304.

In certain embodiments, stack 310 may also include an anti-reflective coating 304, which may assist in reducing "ghost" images. In some embodiments, anti-reflective coating 304 may be situated above sensor mesh 303 but below beamsplitter 306. In the absence of anti-reflective coating 304, there may be some reflection from the bottom of cover 305 in addition to the light reflected from beamsplitter 306 (i.e., the light that is not transmitted through beamsplitter 306). This light reflected from the bottom of cover 305 may cause interference and Fresnel loss to the light beam reflected from beamsplitter 306. This interference may cause aberrations in the image seen by a user on the screen of device 300. Anti-reflective coatings placed on the bottom of the cover layer, such as anti-reflective coating 304 shown in FIG. 3A, may prevent such aberrations.

In particular embodiments, the materials in stack 310 may have refractive indices that are the same or substantially similar to the refractive index of beamsplitter 306. This may help to avoid unwanted or unintended optical phenomena such as reflection or refraction from occurring. For instance, in some embodiments, each of substrate 302, anti-reflective coating 304, and cover 305 may have a refractive index that is substantially similar to the refractive index of beamsplitter 306. As one example, where beamsplitter 306 has a refractive index of 1.5, substrate 302 may have a refractive index of 1.57, anti-reflective coating 304 may have a refractive index of 1.57, and cover 305 may have a refractive index of 1.52.

Beamsplitter 306 may be any suitable optical element with a semi-transparent coating that divides a beam into two or more separate beams. In particular embodiments, beamsplitter 306 may cause an incident light ray to be divided into two rays: one that is reflected by the beamsplitter and one that is transmitted by the beamsplitter. In some embodiments, beamsplitter 306 may be constructed using dielectric layers on a surface to yield specific transmission and reflection characteristics. For example, reflection proportions for beamsplitter 306 may be in the range from 30% to 95%, with the remaining percentage of the light being transmitted through beamsplitter 306 without any absorption. In particular embodiments, beamsplitter 306 may be made using dielectric coatings with reflection ranges from 50% to 75% and transmittance ranges from 50% to 25%. As shown in FIG. 3B, these ranges of reflection and transmittance may allow for sufficient enough reduction of the visibility of mesh reflection while also will allowing sufficient contrast ratios for the displayed images.

Herein, reference to a non-transitory computer-readable storage medium or media may include one or more semiconductor-based or other integrated circuits (ICs) (such, as for example, a field-programmable gate array (FPGA) or an application-specific IC (ASIC)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards, SECURE DIGITAL drives, any other suitable computer-readable non-transitory storage medium or media, or any suitable combination of two or more of these, where appropriate. A computer-readable non-transitory storage medium or media may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. An apparatus, comprising:
   a display;
   a first touch-sensor layer comprising a first plurality of conductive electrodes, wherein the first plurality of conductive electrodes comprises a metal mesh and is disposed on a first substrate;
   a second touch-sensor layer comprising a second plurality of conductive electrodes, wherein the first plurality of conductive electrodes and the second plurality of conductive electrodes are electrically connected to one or more tracks of conductive material;
   a beamsplitter operable to reflect a first portion of light incident on the coating and transmit a second portion of light incident on the coating, wherein the first portion of light is in the range of 30% to 95%, and the second portion of light is in the range of 5% to 70%;
   wherein the beamsplitter is disposed above the first touch sensor layer;
   wherein the beamsplitter is on a side of the first touch sensor layer opposite the display;
   a touch-sensor controller configured to detect and process the change in capacitance at one or more touch-sensor nodes to determine the presence and location of a touch-sensor input, and further configured to communicate information about the touch-sensor input to one or more components of the apparatus; and
   a flexible printed circuit electrically connected to the touch-sensor controller, wherein the one or more tracks of conductive material on the substrate is electrically connected to the flexible printed circuit.

2. The apparatus of claim 1, wherein the first plurality of conductive electrodes and the second plurality of conductive electrodes are configured to capacitively couple across a dielectric material.

3. The apparatus of claim 2, wherein a layer of anti-reflective coating is disposed above the first touch-sensor layer.

4. The apparatus of claim 3, wherein refractive indices of the beamsplitter, the first substrate, and the anti-reflective coating are substantially similar to each other.

5. The apparatus of claim 2, wherein the second plurality of conductive electrodes is disposed on a second substrate.

6. The apparatus of claim 2, wherein the second plurality of conductive electrodes is disposed on the opposite side of the first substrate.

7. The apparatus of claim 2, wherein the display comprises a liquid crystal display.

8. The apparatus of claim 2, wherein the beamsplitter is adjacently disposed on the first touch sensor layer.

9. The apparatus of claim 2, wherein a third substrate is disposed between the beamsplitter and the first touch sensor layer.

10. The apparatus of claim 2, wherein refractive indices of the beamsplitter and the first substrate are substantially similar to each other.

11. The apparatus of claim 1, wherein the beamsplitter is operative to reduce display issues caused by light reflecting off the first plurality of conductive electrodes.

12. The apparatus of claim 1, wherein the beamsplitter comprises a half-mirror coating disposed above the first plurality of conductive electrodes to reduce display issues caused by light reflecting off the first plurality of conductive electrodes.

13. An apparatus, comprising:
a display;
a first touch-sensor layer comprising a first plurality of conductive electrodes, wherein the first plurality of conductive electrodes is disposed on a first substrate, the first plurality of conductive electrodes comprising sense electrodes;
a second touch-sensor layer comprising a second plurality of conductive electrodes, wherein the first plurality of conductive electrodes and the second plurality of conductive electrodes are electrically connected to one or more tracks of conductive material;
wherein the first plurality of conductive electrodes and the second plurality of conductive electrodes are configured to capacitively couple across a dielectric material;
a beamsplitter operable to divide a light beam into two or more separate light beams, wherein the beamsplitter is disposed above the first touch sensor layer on a side of the first touch sensor layer opposite the display, wherein the beamsplitter is operable to reflect a first portion of light incident on the beamsplitter and transmit a second portion of light incident on the beamsplitter, wherein the first portion of light is in the range of 30% to 95%, and the second portion of light is in the range of 5% to 70%;
a touch-sensor controller configured to detect and process the change in capacitance at one or more touch-sensor nodes to determine the presence and location of a touch-sensor input, and further configured to communicate information about the touch-sensor input to one or more components of the apparatus; and
a flexible printed circuit electrically connected to the touch-sensor controller, wherein the one or more tracks of conductive material on the substrate is electrically connected to the flexible printed circuit.

14. The apparatus of claim 13, wherein the first portion of light is in the range of 50% to 75%, and the second portion of light is in the range of 25% to 50%.

15. The apparatus of claim 13, wherein the beamsplitter comprises a half-mirror coating to reduce the display issues caused by light reflecting off the first plurality of conductive electrodes.

16. The apparatus of claim 13, wherein the first plurality of conductive electrodes comprises a metal mesh.

17. The apparatus of claim 13, wherein the first plurality of conductive electrodes comprises indium tin oxide.

18. The apparatus of claim 13, wherein the second plurality of conductive electrodes is disposed on a second substrate.

19. The apparatus of claim 13, wherein the second plurality of conductive electrodes is disposed on the opposite side of the first substrate.

* * * * *